Figure 1:
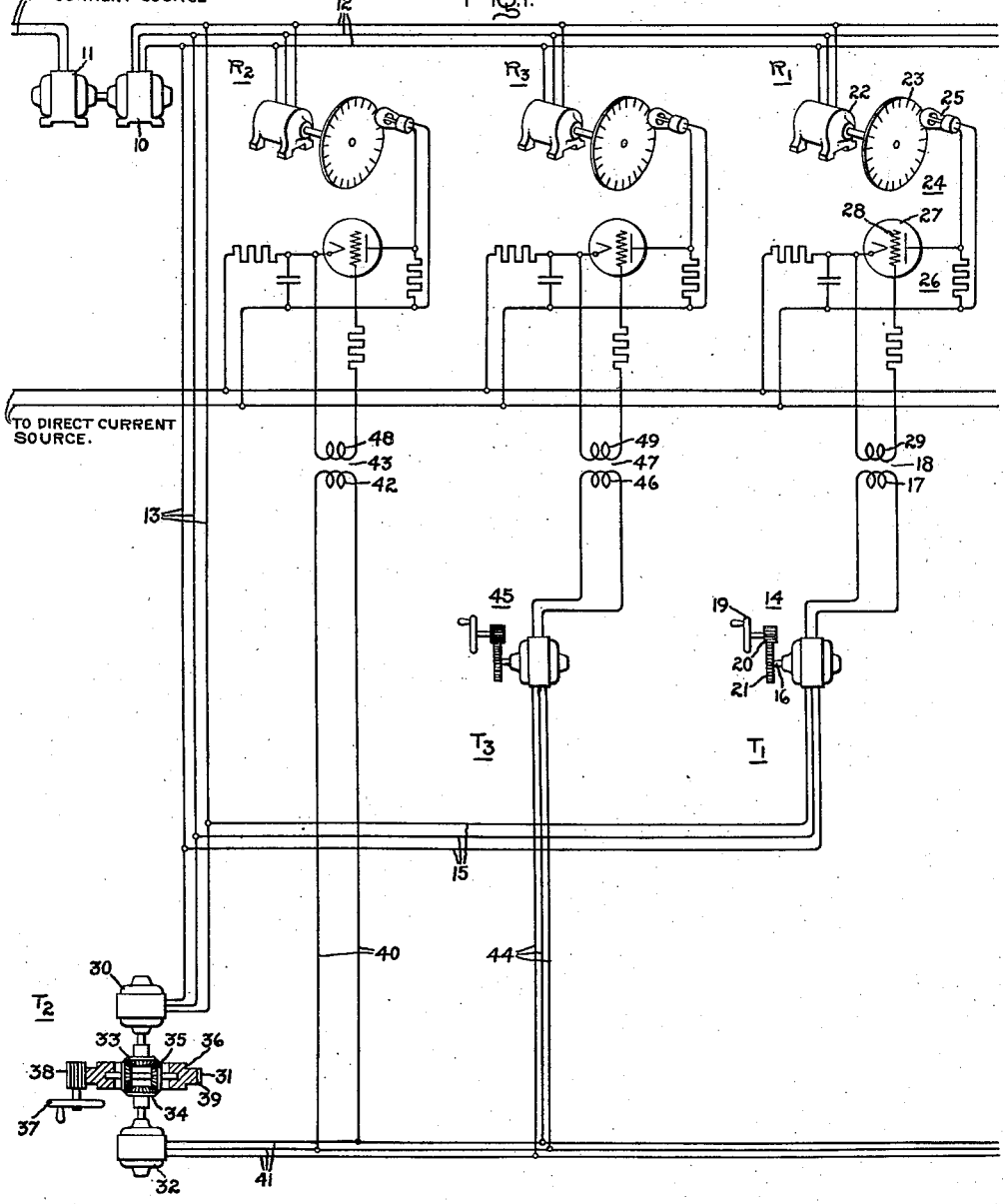

Dec. 26, 1939.   E. E. LIBMAN ET AL   2,184,355
TELEMETRIC SYSTEM FOR ANGLE TRANSMISSION
Filed May 20, 1937   2 Sheets-Sheet 2

Inventors:
Earl E. Libman,
Martin A. Edwards,
by Harry E. Dunham
Their Attorney.

Patented Dec. 26, 1939

2,184,355

UNITED STATES PATENT OFFICE 2,184,355

TELEMETRIC SYSTEM FOR ANGLE TRANSMISSION

Earl E. Libman and Martin A. Edwards, Schenectady, N. Y., assignors to General Electric Company, a corporation of New York Application May 20, 1937, Serial No. 143,749

6 Claims. (Cl. 177—337)

Our invention relates to telemetric systems and more particularly to stroboscopic, angle-transmission systems.

The object of the invention is to provide an improved means for indicating by stroboscopic means, at a receiving point or station remote from a given observation or transmitting point or station, the angular relation between certain elements at the transmitting point.

The stroboscopic system for angle transmission in accordance with our present invention includes, at the receiving station, a stroboscopic device having a motor-driven rotating dial periodically illuminated by a discharge of short duration from a luminous gas tube or other suitable source of illumination; and at the transmitting station, means to determine the periods of illumination of the dial and to shift the phase of the lamp energization periods with respect to the revolution period of the dial. There are thus brought together upon the dial two components; one, the flash which illuminates the dial, controlled by the timing of the impulse that produces or initiates the energizing of the stroboscope lamp or tube; and the other, the position of the dial at the instant the flash is initiated, which is controlled by the phase of the voltage applied to the dial driving motor. If the phase of one or both of these components is progressively changed, an apparent rotation of the dial is produced. By suitable arrangements, the phase of either component may be varied in proportion to the angular displacement of given elements, such as the displacement of a shaft with respect to a fixed element. The dial, with suitable calibration, may then be used to repeat the shaft angle.

Further in accordance with the present invention, in order that the dial and the means for determining the periods of lamp energization may operate in synchronism, a suitable current source is preferably provided which is distributed to all parts of the system. The dial driving motor and the above-mentioned means, operating in synchronism on this current, supply the dial position component to each of the angle transmitting and receiving stations. Instead of being energized from the same current source, however, the dial motor and the means at the transmitting station for determining the periods of lamp illumination may be separately energized, synchronism being maintained by suitable signal means over either wire or radio channels.

The current pulse which determines the periodic energization of the stroboscopic lamp or tube is preferably supplied directly over a wire channel which extends from the transmitter station and is connected to a peaking transformer. However, any other suitable means for supplying the current pulse over a wire channel from the transmitting station synchronously with the rotation of the dial at the receiving station may be used. Further, the pulse for initiating the periodic energization of the stroboscope lamp or tube may be transmitted over a radio channel instead of over a wire channel.

Preferably the means to determine the lamp energization periods and to shift the phase of these periods with respect to the revolution period of the dial comprises a phase control device at the transmitting station, having a fixed winding supplied from the above-mentioned current source and having a rotor adjustable by a suitable manual control means, the device being electrically connected to the stroboscopic device through means preferably including a peaking transformer. However, the means to determine the lamp energization periods may comprise a rotating element at the transmitting station driven by a motor supplied from the same current source which supplies the dial motor, or the dial motor and the motor for driving the rotating pulse-timing element may be maintained in synchronism by any other suitable means. When the latter pulse-timing arrangement is employed, the means to shift the phase of the lamp energization periods may comprise a differential gear connection between the synchronous motor and the rotatable pulse-timing element driven thereby. Any other suitable means for shifting the phase of the lamp energization periods may also be used.

In certain cases the current pulse for energizing the lamps of the stroboscopic devices at a plurality of angle receiving points or stations may be supplied from a single pulse generating means at an angle transmitting point or station; the current pulse to one or more of such plurality of angle receiving stations may then be supplied through an angle correction device. Further, a single synchronous motor at an angle transmitting point or station may be arranged to drive a plurality of pulse generating means at different speeds, for operation, for example, of a so-called "high and low speed" angle transmission system.

Our invention will be better understood from the following description when considered in connection with the accompanying drawings and its scope will be pointed out in the appended claims.

Figure 2:
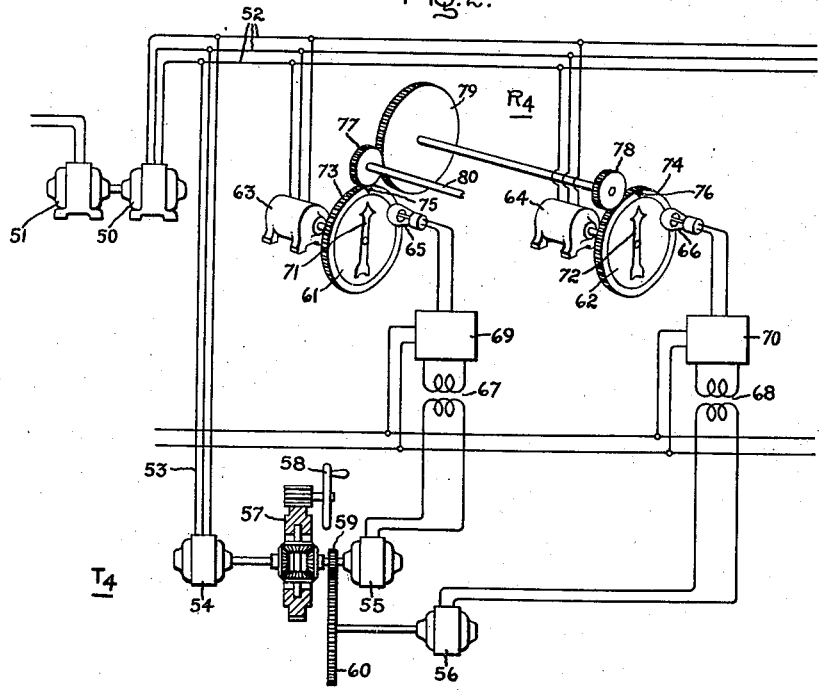

Referring to the drawings, Fig. 1 is a semi-diagrammatic representation of a stroboscopic, angle-transmission system in which our invention has been embodied, and Fig. 2 represents a modification of the embodiment shown in Fig. 1.

In the angle-transmission system illustrated in Fig. 1, R₁ indicates an angle receiving station and T₁ the corresponding angle transmitting station. R₂ and R₃ indicate receiving stations the corresponding transmitting stations for which, indicated by T₂ and T₃, are energized from a single generator. The transmitting stations may be separated from the receiving stations by any required distance across which the angles are to be transmitted. Preferably, a single source of low frequency current for the entire system is provided, which may comprise a three-phase generator 10 driven by a motor 11 supplied from a suitable source. The driving current from generator 10 is supplied to the receiving stations over wire lines 12 and to the transmitting stations over wire lines 13.

Referring more particularly to the transmitting station T₁ and the receiving station R₁ corresponding thereto, at station T₁ a phase control device 14 is provided for determining the energization periods of the stroboscope tube at the receiving station. The phase control device 14 is preferably of well known form, comprising, for example, a polyphase winding (not shown) connected through leads 15 to the three-phase wire lines 13, and a rotor (not shown) mounted on a shaft 16. The rotor is electrically connected to the primary 17 of a peaking transformer 18. To control the phase of currents transmitted from device 14 a manual control means is provided which may comprise a hand wheel 19 connected to shaft 16 through gears 20 and 21. At the corresponding receiving station, R₁, a synchronous motor 22 is provided, connected to the three-phase lines 12 and arranged to drive an indicating dial 23 of a stroboscopic device 24 having an illumination means or lamp 25 connected to the output circuit 26 of a space discharge device 27. The latter device is connected to a source of direct current and is provided with a control electrode 28 in circuit with the secondary 29 of peaking transformer 18.

Referring now to the transmitting stations T₂ and T₃ and the corresponding receiving stations R₂ and R₃, for the two transmitting stations a single synchronous motor 30 is provided which is connected to the three-phase lines 13 and which is arranged to drive, through a phase shifting means 31 shown as a differential drive gear, a rotating element 32 for determining the energization periods of the corresponding stroboscope tubes. The rotating element 32 is shown in the present embodiment of the invention as a three-phase current generator but other devices comprising rotating elements may be employed for the purpose. The differential drive gear 31 includes gears 33 and 34 connected respectively to the shafts of motor 30 and generator 32, and intermediate gears 35 mounted in a wheel or disk member 36. Member 36 is mounted for rotation about the axis of motor 30 and generator 32, means being provided, such as a hand wheel 37 driving a pinion 38 meshing with teeth 39 in the periphery of wheel 36, to rotate the wheel 36 by predetermined amounts corresponding to angles to be transmitted to the receiving stations.

Generator 32 is electrically connected, through lines 40 connected to two phases of the three-phase lines 41, to the primary 42 of a peaking transformer 43 similar to peaking transformer 18.

To provide means if desired for correction of the angles transmitted from the generator 32 at station T₂ to one of the receiving stations, in the present instance R₃, the generator 32 is connected also, through three-phase lines 41 and 44, to a phase shifting device 45, which may be located in proximity to the angle transmitting means at station T₂, or, as illustrated in Fig. 1, may be located at a separate point, designated as station T₃. Similarly to device 14, phase shifting device 45 may comprise a polyphase winding (not shown), and a rotor (not shown) mounted on a shaft which is adjustable by means of a hand wheel connected to the shaft through gearing, the rotor being electrically connected to the primary 46 of a peaking transformer 47.

At each of the receiving stations R₂ and R₃ are provided a synchronous motor, a stroboscopic device having an indicating dial and a lamp, and a space discharge device having a control electrode, the control electrode being connected respectively to the secondary 48 of peaking transformer 43 and to the secondary 49 of peaking transformer 47, all similarly to the corresponding parts and connections in receiving station R₁.

In operation of the system illustrated in Fig. 1, referring particularly to receiving station R₁ and transmitting station T₁ associated therewith, when no angles are being transmitted from T₁ to R₁, dial 23 is being rotated by motor 22 synchronously with the field set up in the polyphase winding of phase control device 14 by the three-phase current from the common driving current source 10. During each revolution of dial 23 phase control device 14 operates, through peaking transformer 18 which controls the voltage of control electrode 28 of the space discharge device 27, to determine the energization of lamp 25 for periods of time very brief relative to the period of one revolution of the dial 23. The phase relation of the rotor of device 14 with respect to the field set up in the polyphase winding is so set, initially, by adjustment of the rotor shaft 16 by hand wheel 19, that the illumination of disk 23 by the flash from lamp 25 occurs at such time in the revolution of dial 23 that the dial appears stationary with its scale indicating that the angle transmitted from station T₁ is zero angle. When it is desired to transmit a given angle, representing for example the angular displacement of a shaft with reference to its support, the operator at transmitting station T₁ changes, by means of hand wheel 19, the phase of the rotor of device 14 with respect to its field through the given angle, thereby changing correspondingly the timing of the energization of lamp 25 and causing an apparent rotation of the dial 23 which is illuminated by the periodic flashes of the lamp. At the end of the angle-sending operation the dial again appears stationary with its scale, however, now indicating the angle through which the transmitting mechanism at station T₁ has been moved, as above described, by the operator.

Operation of that part of the system shown in Fig. 1 which includes the angle transmitting means at T₂ and T₃ and the angle receiving means at R₂ and R₃ is similar in certain respects to the operation, above described, of the pair of associated stations T₁ and R₁. When transmitting angles to R₂ and R₃, however, motor 30 at the transmitting station T₂ and the dial driving motors at R₂ and R₃ are operated in synchronism by the three-phase current supplied by the common source, generator 10. Generator 32 then determines, through peaking transformer 43, the energization periods of the dial lamp at R₂, and also through phase shifting or angle correction device 45 and peaking transformer 47, the energization periods of the dial lamp at R₃. The operator at T₂ changes, by means of hand wheel 37, the phase of generator 32 with respect to its driving motor 30 through the desired angle thereby causing the dials of both receiving stations R₂ and R₃ to indicate the angle. Correction or change of the angle sent to one of the stations, in the present case R₃, may be made by suitable adjustment of the rotor of phase shifting device 45.

In the modification illustrated in Fig. 2, T₄ and R₄ indicate respectively an angle transmitting station and an angle receiving station similar in certain respects to a transmitting station, as T₂, and receiving station, as R₂, of Fig. 1. As in Fig. 1, in Fig. 2 a single source of current may be provided for driving and synchronizing the motors of the system, comprising a generator 50 driven by a motor 51 supplied from a suitable source, the current from generator 50 being distributed to the receiving station R₄ over wire lines 52 and to the transmitting station T₄ over wire lines 53. At the transmitting station T₄ a synchronous motor 54 is provided similar to motor 30 of Fig. 1. However, instead of driving a single generator or other rotating element, the motor 54 is arranged to drive a plurality of such generators or rotating elements. For example, two generators, 55 and 56, may be actuated by the single motor 54, both generators being preferably driven through a single phase-shifting means or differential gear 57 identical with differential gear 31 of Fig. 1 and similarly provided with a hand wheel 58.

The system in which the above two generators 55 and 56 are employed may be a high and low speed angle transmission system, i. e., a system in which desired angles are sent from the transmitting station over two channels, by means of a high speed generator and a low speed generator, to corresponding high speed and low speed indicating means at the receiving station R₄. Generator 55, the high speed sending means, is arranged to be driven at the same speed as motor 54, and generator 56, the low speed sending means, is arranged to be driven at a lower speed than motor 54 through suitable speed reducing means, as gears 59 and 60. At the receiving station R₄ a plurality of rotating dial members 61 and 62, corresponding respectively to the rotating elements or generators 55 and 56 of transmitting station T₄, are provided which may be driven as shown by separate synchronous motors 63 and 64 supplied with current from the common current source, generator 50. Illumination means or lamps 65 and 66 are mounted adjacent to the dial members 61 and 62. Periodic energization of lamps 65 and 66 may be determined, by generators 55 and 56 respectively, in the same manner as above described in connection with lamps 25 of Fig. 1, through peaking transformers 67 and 68 and means, indicated at 69 and 70, similar to the space discharge devices 27 of Fig. 1.

The above mentioned high and low speed angle-transmission system of Fig. 2 is shown as incorporating, at the receiving station R₄, angle indicating and control apparatus of the "follow the pointer" type. In this apparatus the dials or rotating indicating members 61 and 62 are provided with indicia such as arrows or pointers 71 and 72, and adjacent to and preferably surrounding the dial members are mounted rotatable ring or other suitably shaped members 73 and 74 having thereon suitable indicia, such as arrow points 75 and 76, for alignment with the pointers 71 and 72. To rotate rings 73 and 74 about the axes of dial members 61 and 62 and at the same time to obtain the same speed reduction between rings 73 and 74 as between the corresponding generators 55 and 56, a suitable driving and speed reducing means is interposed between ring 73 and ring 74 which may comprise pinions 77 and 78 meshing respectively with teeth on the rims of the rings, and an intermediate gear 79 on the same shaft with pinion 78 and meshing with pinion 77. The shaft 80 connected to pinion 77 may be connected by any suitable means to a given rotatable element (not shown) the angular position of which with respect to a fixed element is desired to be maintained continually the same as the angle sent to receiving or indicating station R₄ from transmitting or directing station T₄.

In operation of the modification shown in Fig. 2, generator 55 and dial members 61 and 62 are rotated synchronously at high speed by their respective motors 54, 63 and 64, and generator 56 is rotated at a reduced speed determined by the ratio of the speed reducing gears 59 and 60. The operator or director at transmitting station T₄ transmits to receiving station R₄ the desired angles by varying by means of hand wheel 58 the phase of generators 55 and 56 with respect to their driving motor 54, thereby changing correspondingly the timing of the energization of lamps 65 and 66 and causing an apparent angular movement of the dial pointers 71 and 72 which are illuminated by the periodic flashes of the lamps. The apparent angular movement of pointer 72 is reduced with respect to that of pointer 71 in the ratio of the speed reduction means 59 and 60 connecting high speed generator 55 and low speed generator 56. In order to follow the angular changes of pointers 71 and 72, thus indicated by the director at transmitting station T₄, shaft 80 which is connected to the given rotatable element at receiving station R₄ whose angular position is desired to be controlled from transmitting station T₄, is caused to be rotated, by movement of the given rotatable element, as required to maintain the indicia 75 and 76 of ring members 73 and 74 in line with the pointers 71 and 72. By thus causing the indicia 75 and 76 to follow the pointers 71 and 72 the desired angular position of the given rotatable element at the receiving station R₄ is determined by the operator or director at the transmitting station T₄.

It will be understood that, as in Fig. 1, the driving motors in the modification shown in Fig. 2 may be separately driven, the required synchronism of these motors being maintained by suitable control means over either wire or radio channels; that any other suitable means than those shown in Fig. 2 may be used for supplying the current pulse to the illumination means 65 and 66; and that the current pulse may be transmitted over a radio channel instead of a wire channel.

Our invention has been described herein in particular embodiments for purposes of illustration. It is to be understood, however, that the invention is susceptible of various other changes and modifications and that by the appended claims we intend to cover any such modifications as fall within the true spirit and scope of our invention.

What we claim as new and desire to secure by Letters Patent in the United States is:

1. In a telemetric system for indicating at a remote point the angular position of elements at a transmitting point, comprising a source of alternating current, an indicating dial at said remote point and a synchronous motor connected thereto, an illumination means for said dial, means to energize said illumination means for a short period during each revolution of said dial including a phase control device at said transmitting point, means to connect said source of alternating current to said synchronous motor and to said phase control device to drive said motor and said device in synchronism, means operatively associated with said phase control device to shift the phase of said period with respect to the revolution period of said dial.

2. In a telemetric system for indicating at a remote point the angular position of elements at a transmitting point, comprising a source of alternating current, an indicating dial at said remote point and a lamp associated therewith adapted to illuminate said dial periodically, a motor connected to said dial, means to energize said lamp for a predetermined period during each revolution of said dial including a phase control device at said transmitting point, a peaking transformer connected between said device and said lamp to shorten the periods of energization of said lamp, and means to connect said source of alternating current to said motor and to said phase control device to drive said motor and said device in synchronism, means operatively associated with said phase control device to shift the phase of said period with respect to the revolution period of said dial.

3. In a telemetric system for indicating at a remote point the angular position of elements at a transmitting point, comprising an indicating dial at said remote point and a lamp associated therewith adapted to illuminate said dial periodically, a motor connected to said dial, and means to energize said lamp for a predetermined period during each revolution of said dial including at said transmitting point a motor rotating synchronously with said first-named motor and a rotatable element driven by said second-named motor for determining the energization periods of said lamp, means to shift the phase of said period with respect to the revolution period of said dial, said last-named means including a differential gear interconnecting said second-named motor and said rotatable element, and adjustable control means operatively associated with said gear to change the phase of the revolution period of said element with respect to the revolution period of said second named motor.

4. In a stroboscopic system for indicating at a point remote from a transmitting point desired changes in angular position of elements at said remote point, in combination, a plurality of dial members at said remote point, at least one synchronous motor for driving said dial members, separate illumination means for each of said dial members, a synchronous motor and a plurality of rotatable elements driven thereby at said transmitting point at predetermined speeds differing in a predetermined ratio, means to operate said motors in synchronism, means including said rotatable elements to energize the corresponding illumination means for a short period during each revolution of said dial members, means associated with said rotatable elements to shift the phase of said period with respect to the revolution period of said dial members and to maintain the degree of phase shift of the periods corresponding to the several dial members in said predetermined ratio, and means including indicating means in operative relation with said dial members and said first-named elements for shifting the angular position of said first-named elements correspondingly with changes in the apparent angular positions of said dial members.

5. In a stroboscopic system for indicating at a point remote from a transmitting point desired changes in angular position of elements at said remote point, in combination, a plurality of dial members at said remote point, at least one synchronous motor for driving said dial members at the same speed, separate illumination means for each of said dial members, a synchronous motor and a rotatable element driven thereby at said transmitting point, means to operate said motors in synchronism, means including said rotatable element to energize all of said illumination means in synchronism for a predetermined period during each revolution of said dials, means operatively associated with said rotatable element to shift the phase of said period with respect to the revolution period of said dials, and means including a phase control device operatively associated with at least one of said illumination means for shifting independently the energization period of said one of said illumination means.

6. In a stroboscopic system for indicating at a point remote from a transmitting point desired changes in angular position of an element at said remote point, a dial member at said remote point, a synchronous motor for driving said dial member, an illumination means for said dial member, a synchronous motor and a current pulse generator driven thereby at said transmitting point, means to operate said motors in synchronism, means to supply a current pulse from said generator for energizing said illumination means for a short period during each revolution of said dial, means operatively associated with said generator to shift the phase of said current pulse with respect to the revolution period of said generator driving motor, and means for shifting the phase of said energizing period of said illumination means with respect to the phase of said current pulse, said last named phase shift means including a phase control device energized from said generator and operatively associated with said illumination means.

EARL E. LIBMAN.
MARTIN A. EDWARDS.